United States Patent Office 3,519,491
Patented July 7, 1970

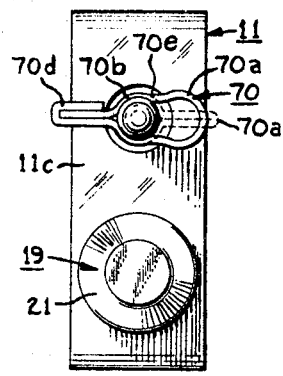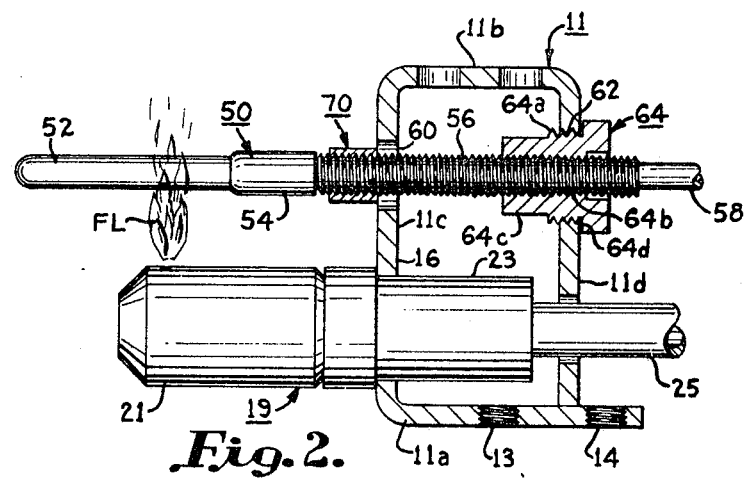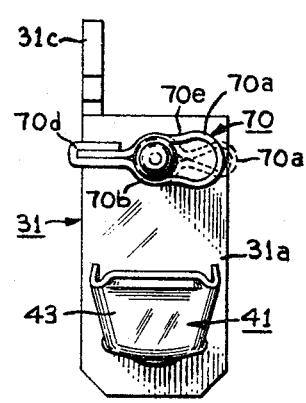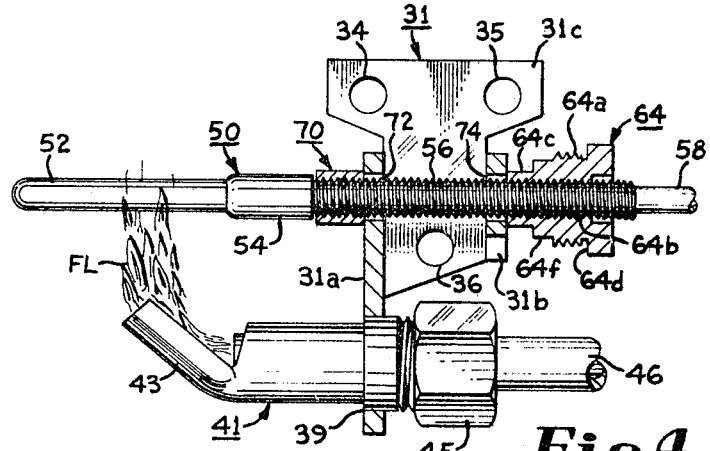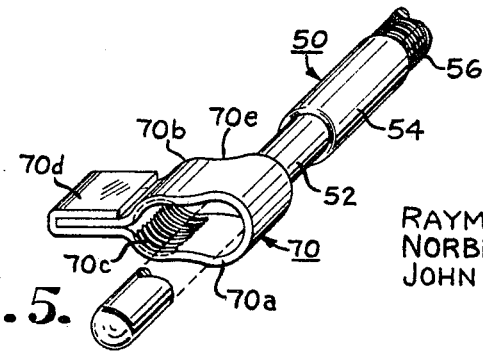
RAYMOND E. GROHALL
NORBERT J. MIMIER   INVENTOR.(S)
JOHN H. THORNBERY
BY *J. J. De Angelis*
ATTORNEY.

3,519,491
THERMOCOUPLE POSITIONING AND
MOUNTING MEANS
Raymond E. Grohall, Norbert J. Mimier, and John H.
Thornbery, Milwaukee, Wis., assignors to Penn Controls, Inc., Oak Brook, Ill., a corporation of Delaware
Filed June 27, 1968, Ser. No. 740,542
Int. Cl. G01k 1/14
U.S. Cl. 136—217                    10 Claims

ABSTRACT OF THE DISCLOSURE

A threaded thermocouple is easily mountable in correct position in a variety of thermocouple-gas burner assemblies equipped with a mounting bracket having an aperture defined therein for receiving the thermocouple. A connector nut threaded onto the thermocouple is externally threaded for fastening in cooperating threads cut into the bracket aperture. In another version the nut cooperates with a second threaded fastener for mounting and positioning the thermocouple on the bracket. The fastener is of substantially elongated slot cross-sectional shape, the midsection of the slot being slightly reduced to define two contiguous, thermocouple encircling portions. A first one of such portions is dimensioned for a loose fit over the thermocouple for free longitudinal movement along the thermocouple length to a position abutting the mounting bracket and encircling a threaded portion of the thermocouple. The second of such substantially circular fastener portions is provided with internal threads and is dimensioned for threaded engagement with the threaded portion of the thermocouple. After the fastener is slid to a position abutting the bracket, the fastener is moved in a radial direction, causing its loose fitting portion to move out of encircling position and placing its threaded portion into threaded engagement with the thermocouple. In this position the fastener is readily removable by a simple radial movement to replace its thread engaging portion with its loose fitting portion on the thermocouple. Alternately, the fastener may be crimped at its loose fitting portion such that, thereafter, the fastener may only be moved relative to the thermocouple by threaded movement thereon. In one version of the assembly, a guide tip is provided on the connector nut for easy guidance into the receiving aperture. In a version designed for brackets equipped with unthreaded thermocouple receiving apertures, the connector nut has no external threads but has one or more abutting surfaces dimensioned to act as positioning stops against the mounting bracket.

The invention relates to thermocouple-gas burner assemblies and, more particularly, to the fastening of the thermocouple to the bracket supporting the burner for practically all thermocouple-pilot burner combinations presently in use in modern day heating systems.

Thermocouples used in heating systems periodically need replacement creating a substantial replacement market therefor. The thermocouple-gas burner combinations for which thermocouple replacements are required often differ in construction because of different manufacturing origins. However, it is desirable to provide one thermocouple and associated positioning and fastening means which are adapted for universal installation in practically all thermocouple-pilot burner combinations presently in service.

Many of these thermocouple-pilot burner combinations are installed in locations not readily accessible for replacement of the thermocouple, for example, in "hard-to-view" areas found in some water heaters. Nevertheless, the replacement thermocouple must be located with its temperature sensing tip in optimum position to be heated by the pilot flame for proper operation. This position varies somewhat with the design of the thermocouple-pilot burner combination being serviced. It is desirable that a universal thermocouple be correctly positioned and fastened in the burner assembly without the use of special tools, in a simple manner and without the serviceman having visual contact with the assembly.

It is, therefore, an object of the invention to provide a universal thermocouple and improved thermocouple positioning and mounting means to enable the easy installation of a universal thermocouple in substantially all thermocouple-pilot burner combinations presently in service.

In carrying out the invention according to a preferred embodiment, a concentric thermocouple having a temperature sensing tip portion is provided with a supporting portion which is threaded axially substantially along its entire length. A connector nut is threaded onto the thermocouple supporting portion and cooperates with a thermocouple receiving aperture defined in the pilot burner mounting bracket to position the thermocouple correctly in relation to the pilot flame.

In one embodiment the connector nut is provided with external threads dimensioned to cooperate with threads in the thermocouple receiving aperture of the mounting bracket, where the bracket is so equipped. The connector nut is also provided with a guiding tip portion for ready alignment of the connector nut with the thermocouple receiving aperture for ease of installation where the bracket is not viewable by the serviceman. An abutting surface on the nut acts as a stop against the mounting bracket.

In a slightly different embodiment the guide tip of the connector nut is "stepped" to provide one or more abutting surfaces for cooperation with correspondingly dimensioned thermocouple receiving apertures in various mounting brackets. Especially for such installations a second fastener for the thermocouple is provided. This latter fastener is in the shape cross-sectionally of an elongated slot, slightly reduced at its midsection to provide two contiguous, thermocouple encircling portions. A first one of such thermocouple encircling portions is dimensioned for a loose fit over the thermocouple to enable the fastener to be slipped freely over the thermocouple into abutting position with the pilot burner mounting bracket. The second thermocouple encircling portion is provided with internal threads and dimensioned to cooperate with the aforementioned threaded supporting portion of the thermocouple. After this fastening means is slid freely over the thermocouple into abutting position with the mounting bracket, it is moved radially, causing the thermocouple to pass through its reduced midsection portion placing the second thermocouple encircling portion into threaded engagement with the thermocouple. Threaded movement of the fastener then locks the thermocouple with its cooperating connector nut in optimum position on the pilot burner mounting bracket. In such threaded position the second fastening means is readily removable by reverse radial movement. Alternately, if desired, the loose fitting, encircling portion of this fastening means may be crimped to prohibit further removal of the fastening means from the thermocouple by other than threaded relative motion thereon.

Features and advantages of the invention will be seen from the above, from the following description of operation of the preferred embodiment when considered in conjunction with the drawing and from the appended claims.

In the drawings:

FIG. 1 is a front elevational view of one modification of the invention with the fastening means 70 shown in broken line outline in crimped condition;

FIG. 2 is a side elevational view of the embodiment of FIG. 1 with parts broken away;

FIG. 3 is a front elevational view similar to that of FIG. 1 but of another modification of the invention;

FIG. 4 is a side elevational view of the embodiment of FIG. 3 with parts broken away; and FIG. 5 is a fragmentary view in perspective of the fastening means 70 in free fitting position over the temperature sensing end 52 of the thermocouple 50 of the foregoing figures.

Referring to FIGS. 1 and 2 of the drawing, a mounting bracket 11 comprises two horizontally extending flanges 11a, 11b interconnected by two spaced apart, vertically disposed flanges 11c and 11d. Bracket 11 may be formed from flat stock bent to form the substantially rectangular mounting bracket shown. Two threaded holes 13 and 14 are defined in horizontal flange 11a of mounting bracket 11 for the reception of bolts (not shown) for mounting the bracket alongside of a main burner (not shown). Vertical flange portion 11c of bracket 11 has a hole 16 defined therein through which the tubular body 19 of a pilot burner extends. Pilot burner body 19 may be secured to flange 11c in any convenient manner, such as by force fit into hole 16, by welding or by staking. Burner body 19 has a head portion 21 and a connector portion 23 for connection to a gas supply conduit 25. Burner head 21 is designed and positioned to abut mounting bracket 11 such that it directs the pilot flame FL upwardly at a predetermined distance to the left of vertical flange 11c of the mounting bracket.

A different type of mounting bracket and pilot burner is illustrated in FIGS. 3 and 4 of the drawing wherein the mounting bracket is designated 31 and comprises two vertically disposed flanges 31a and 31b interconnected by a web portion 31c. Mounting bracket web 31c is provided with three holes 34, 35 and 36 for receiving bolts (not shown) for mounting bracket 31 near a main burner (not shown).

A hole 39 is defined in mounting bracket flange 31a for receiving a pilot burner body 41. Pilot burner body 41 may be mounted in hole 39 onto bracket 31 by welding, staking or by press fit therein. Burner body 41 has a head portion 43 extending upwardly from the left end thereof and has a connector 45 threaded onto its right end for connecting a gas supply conduit 46 thereto. Burner head 41 with its head portion 43 is designed and positioned to direct gas flame FL upwardly at a predetermined point to the left of vertically disposed flange 31a of mounting bracket 31.

The thermocouple is generally designated 50 and comprises an outer tubular member 52 and a coaxially arranged and internally disposed rod-shaped element (not shown) of well known construction. Thermocouple unit 50 has a larger diameter, intermediate portion 54 which is threaded at 56 for substantially its entire length. Extending from the right end of the thermocouple unit is an outer tubular portion 58 of a pair of concentric leads, the inner lead not being shown, of well known construction. The left tip portion 52 of the thermocouple is the heat sensing portion thereof and is to be positioned in flame FL of the pilot burner in optimum position to be heated by mounting on the pilot burner mounting bracket. The threaded portion 56 of the thermocouple is its supporting portion by which it is mounted on burner assembly mounting brackets.

In order to mount thermocouple unit 50 in bracket 11 of the thermocouple-pilot burner assembly shown in FIGS. 1 and 2, mounting bracket 11 is provided with two aligned thermocouple receiving holes 60 and 62 defined in vertically extending flanges 11c and 11d, respectively. Hole 62 in flange 11d is threaded to cooperate with external threads 64a cut on a connector nut 64 for fastening the thermocouple in position. Connector nut 64 also has internal threads 64b dimensioned for threaded engagement with threaded portion 56 of thermocouple 50. The left portion 64c of connector nut 64 is not threaded but is substantially the dimension of hole 62 to serve as a guide for placing the connector nut in threaded engagement in hole 62. This guide tip 64c is especially useful under conditions where mounting bracket 11 is not in view of the serviceman. Connector nut 64 is also provided with a concentric abutting surface 64d for abutting engagement with the right side (FIG. 2) of vertical flange 11d of mounting bracket 11 to act as a stop for the nut.

In assembly, connector nut 64 is threaded onto supporting portion 56 of the thermocouple unit before the supporting portion is connected to tubular portion 58. Thermocouple 50 is then inserted through holes 62 and 60 of mounting bracket 11 to place its heat sensing tip 52 in correct position with respect to flame FL of pilot burner 19. Connector nut 64 is then threaded along threaded supporting portion 56 of the thermocouple unit into threaded hole 62 of bracket flange 11d until it limits against the flange.

In certain installations where threaded engagement of connector nut 64 with flange 11d of mounting bracket 11 is "sloppy" or a loose fit a second fastening means, if desired, may be utilized to lock thermocouple unit 50 into assembled position. In such cases, a fastener 70 is utilized. Fastener 70 (FIG. 5) comprises a nut having a substantially elongated slot configuration in cross section with the midsection of the slot slightly reduced in dimension at 70e to provide two contiguous substantially circular thermocouple encircling fastening portions 70a and 70b. First circular portion 70a is of a diameter slightly greater than the maximum diameter of thermocouple unit 50 to enable fastener 70 to be loosely and freely slipped over the thermocouple along its entire length. The other circular portion 70b of fastener 70 is provided with internal threads 70c and dimensioned for threaded engagement with supporting portion 56 of thermocouple 50. Internal threads 70c may best be seen in the perspective view of FIG. 5 where fastener 70 is shown with its loose fitting encircling portion 70a in "free fit" position over temperature sensing end 52 of thermocouple unit 50.

Fastener 70 may be formed of any flat stock and in one preferred embodiment was formed of number 430 stainless steel of .020 inch flat stock cut to proper length and bent to form the elongated slot fastener with the free end of the flat stock bent over at 70d to close the fastener loop. Alternately, the stock may be merely bent to form a closed loop fastener and brazed or welded at 70d rather than bent over as shown.

In assembly fastener 70 is placed over temperature sensing end 52 of thermocouple 50 and by means of its loose fitting portion 70a slipped over the thermocouple into position where it abuts the left portion of vertical flange 11c (FIGS. 1, 2) of mounting bracket 11. In such position fastener 70 is moved in a radial direction with respect to the longitudinal axis of thermocouple 50 from the position shown in FIG. 5 to that shown in FIG. 1. During such radial movement thermocouple 50 passes through the narrow midsection portion 70e of fastener 70 to move from loose fitting portion 70a into engagement with threaded portion 70b. In this position, fastener 70 is in locked, threaded engagement with supporting portion 56 of thermocouple 50, removably locking the thermocouple in mounted position. For ready removal of the assembly, the radial movement of fastener 70 is reversed, fastener 70 being moved out of threaded engagement to return to its loose fitting position with portion 70a encircling the thermocouple such that fastener 70 may be readily slipped off the thermocouple.

If desired, when assembled as shown in FIG. 2, the loose fitting or encircling portion 70a of the fastener may be crimped or otherwise flattened, as shown in broken line outline in FIG. 1, preventing fastener 70 from subsequently being removed by radial movement with respect to thermocouple 50. Such flattening of fastener portion 70a limits movement of fastener 70 with respect to thermocouple 50, thereafter, to threaded movement thereon as any other ordinary threaded fastener.

It may be noted that fastener 70 need not be made of spring or resilient material. In fact in one tested embodiment the material used is of relatively soft stock. Its "snap-on" and "snap-off" removable feature is due to its configuration rather than to any resiliency of material used. In this manner the fastener may be used under conditions of high heat where resilient or spring type material would lose its temper and fail. However, for installations where the temperature at fastener 70 is below approximately 400° F. it can be constructed of spring steel and tempered to provide a better "snap-on" and "snap-off" function without the fear of heat causing the steel to lose its temper. Such a spring steel embodiment of fastener 70 may be crimped at its midsection 70e, as shown in broken line outline in FIG. 3, instead of having its portion 70a flattened entirely, as shown in the relatively soft steel fastener 70 embodiment of FIG. 1.

Thermocouple unit 50 is assembled in the slightly different assembly of FIGS. 3 and 4 by threading connector nut 64 onto the threaded supporting portion 56 of the thermocouple 50 when the thermocouple is being fabricated. The thermocouple is passed through two aligned over-sized holes 72 and 74 defined in flanges 31a and 31b, respectively of mounting bracket 31 of the assembly. Connector nut 64 is then threaded on the thermocouple until its end or tip 64c abuts flange 31b. Fastener 70 is then slipped over the thermocouple end 52 and moved radially into a threaded engagement with supporting portion 56 of the thermocouple, as was previously described, to lock the assembly in position. If desired, as was also previously described, fastener 70 may be then crimped as shown in the broken line outline showing of its portion 70a to prevent further easy removal from the thermocouple. Connector nut 64 may be provided with increasing diameter steps 64f for cooperation with thermocouple receiving holes 74 of various dimensions.

From the above description of the invention, it may be readily seen that the subject universal thermocouple and its positioning and mounting means requires a minimum of parts and yet is easily mountable in optimum position in a variety of thermocouple-pilot burner assemblies.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:

1. In a thermocouple-gas burner assembly including,
a gaseous fuel burner and its associated mounting bracket for mounting said assembly on supporting framework,
said mounting bracket having a thermocouple supporting portion having at least one thermocouple receiving aperture defined therein,
a thermocouple comprising a substantially tubular member having a temperature-sensing end portion and a supporting portion, said supporting portion being threaded for a predetermined distance along its longitudinal axis,
a connector nut for cooperating with said threaded supporting portion, said connector nut having an abutment for engagement with said supporting bracket for positioning said thermocouple on said bracket under conditions where said thermocouple extends through said thermocouple receiving aperture for placing its said temperature sensing end portion in a predetermined position relative to said burner, and
fastening means adapted for loosely encircling said thermocouple end portion for easy free movement along the longitudinal length of said thermocouple end portion to a position contiguous to said mounting bracket portion.
said fastening means having a portion formed with threads for cooperating with said threaded supporting portion of said thermocouple, said fastening means being adapted for placing its said threaded portion in thread engaging relationship with said supporting end of thermocouple by movement of said fastening means in a direction substantially perpendicular to the longitudinal axis of said thermocouple.

2. The combination set forth in claim 1 wherein said mounting bracket thermocouple receiving aperture is threaded, and
said connector nut is provided with external threads for cooperation with said threaded aperture for fastening said thermocouple in said predetermined position.

3. The combination set forth in claim 1 wherein said connector nut is stepped to provide at least two spaced apart coaxial abutments of decreasing diameter for engaging said mounting bracket in accordance with the selected diameter of an associated thermocouple receiving aperture formed in said bracket for positioning said thermocouple in said bracket.

4. The combination set forth in claim 1 wherein said mounting bracket is provided with two spaced apart, mounting flanges having coaxially aligned thermocouple receiving apertures for receiving said thermocouple therethrough, and
wherein said connector nut cooperates with a first one of said flanges for mounting said thermocouple, while said fastening means cooperates with the other of said flanges for locking said thermocouple to said bracket.

5. The combination set forth in claim 1 wherein said fastening means comprises a piece of flat metal stock bent to form a fastener of substantially elongated slot cross-sectional shape, said elongated slot shaped fastener forming two substantially circular, thermocouple encircling portions interconnected by an intermediate slotted portion of slightly reduced cross-sectional area, and
wherein a first one of said circular encircling portions is of slightly greater diameter than the other and dimensioned for ready loose movement over said thermocouple supporting end, and
wherein the other of said circular encircling portions is provided with internal threads and dimensioned for threaded mating engagement with said supporting end of said thermocouple, under conditions where said fastener is loosely slipped into a position against said mounting bracket encircling said threaded portion of said thermocouple and by radial movement said fastener is then moved through its said intermediate portion placing its said threaded other portion in removable, threaded engagement with said supporting end of said thermocouple for threaded movement thereon.

6. The combination as set forth in claim 5 wherein said larger diameter circular portion of said fastener is crimped when said fastener is in threaded engagement on said thermocouple for preventing further ready removal of said fastener by radial movement and limiting further movement of said fastener with respect to said thermocouple to threaded movement thereon.

7. In the combination set forth in claim 1 wherein said fastener is constructed as a nut having a substantially elongated slot cross-sectional shape with the mid-section of said slot being slightly reduced to define two contiguous, substantially circular in cross-section portions, a first one of said circular portions being dimensioned of a diameter slightly greater than the diameter of said thermocouple for ready loose axial movement therealong, and the other of said circular portions being threaded internally and dimensioned for threaded engagement with said supporting end portion of said thermocouple.

8. In combination an elongated tubular member and mounting framework therefor, said framework having an aperture for receiving said tubular member, means for fastening said tubular member on said framework in said aperture with the tip of said tubular member protruding a predetermined distance from said framework, characterized in that a fastener is provided, which fastener comprises two portions, each constructed with apertures for encircling said tubular member, said encircling portions being adjacent to each other and interconnected by an intermediate portion defining an opening interconnecting the apertures of said encircling portions, said opening being dimensioned smaller than either of said encircling portion apertures such that said fastener forms in cross section substantially an elongated slot with a narrowed midsection, a first one of said tubular member encircling fastener portions being dimensioned to fit loosely over said tubular member for "free fitting" loose movement along said member in a longitudinal direction, said second of said tubular member encircling fastener portions being dimensioned for a "snug" fit onto said tubular member, said tubular member being inserted in said receiving aperture in said framework, said fastener being slid over the protruding end of said tubular member by means of the loose "free fit" of its said first encircling portion into abutting position against said framework, said fastener then being moved in a direction perpendicular to the longitudinal axis of said tubular member causing said tubular member to pass from said "free fitting" first encircling portion of said fastener through said intermediate portion passageway of narrowed dimensions into said "snug" fitting second encircling fastener portion for removably locking said tubular member in a desired predetermined position in said framework.

9. In the combination set forth in claim 8 wherein said fastener is constructed of resilient material for "snap-on" "snap-off" placing of its said second encircling fastener portion into and out of said "snug" fit with said tubular member.

10. In the combination as set forth in claim 9 wherein said fastener, after being placed with its said second encircling fastener portion onto said tubular member is crimped at its said intermediate portion for preventing easy "snap-off" removal of said fastener from said tubular member thereafter.

References Cited

UNITED STATES PATENTS

| 1,822,887 | 9/1931 | Hagstedt | 285—357 |
| 2,397,367 | 3/1946 | Orzel | 285—158 XR |
| 2,445,358 | 7/1948 | Maechtlen et al. | 285—158 |
| 2,920,126 | 1/1960 | Hasny | 136—217 |
| 2,964,437 | 12/1960 | Appleton et al. | 285—158 XR |
| 3,167,292 | 1/1965 | Meyerowitz | 248—56 XR |
| 3,178,140 | 4/1965 | Kuhn et al. | 136—217 XR |
| 3,290,178 | 12/1966 | Loveland | 431—80 XR |

DONLEY J. STOCKING, Primary Examiner

R. A. DUA, Assistant Examiner

U.S. Cl. X.R.

136—230; 285—158; 431—80